March 24, 1959 A. R. JUBENVILLE 2,878,587

PLUG-IN MOUNTING BLOCK FOR ELECTRICAL INSTRUCTION BOARD

Filed June 22, 1953 3 Sheets-Sheet 1

Inventor:
Arthur R. Jubenville,
by Robert K. Randall,
Attorney

PLUG-IN MOUNTING BLOCK FOR ELECTRICAL INSTRUCTION BOARD

Filed June 22, 1953 3 Sheets-Sheet 2

Inventor:
Arthur R. Jubenville,
by Robert K. Randall
Attorney

March 24, 1959 A. R. JUBENVILLE 2,878,587

PLUG-IN MOUNTING BLOCK FOR ELECTRICAL INSTRUCTION BOARD

Filed June 22, 1953 3 Sheets-Sheet 3

Inventor:
Arthur R. Jubenville
by Robert K. Randall
Attorney 2,878,587
Patented Mar. 24, 1959

2,878,587

PLUG-IN MOUNTING BLOCK FOR ELECTRICAL INSTRUCTION BOARD

Arthur R. Jubenville, Huntington, N.Y.

Application June 22, 1953, Serial No. 363,208
9 Claims. (Cl. 35—19)

This invention relates to a mounting block for an electrical or electronic circuit component, of the type characterized by upwardly extending terminal pins thereon in electrical connection with the component such as a condenser, resistor, transformer or the like, and also having downwardly extending retaining pins which are passed through correspondingly spaced holes distributed throughout a panel, to hold the block and component in fixed but easily detachable working relation thereon and with respect to other components similarly mounted and fixed.

Educational and training devices have heretofore been proposed for use in the training of electrical and electronic students and apprentices in which a transparent template bearing printed instructions and a diagram for the forming of an electrical circuit is provided over a non-conducting panel provided with suitably arranged studs serving as connecting posts for the circuit. In these constructions, the electrical circuit is taught by the sight method and the perforated template is positioned over the panel, which extend to engage the studs of the panel through the perforations in the template to permit the connecting of the wires and circuit elements thereto in accordance with the instructions on the template. Further, testing equipment is mounted on the panel to permit measurements to be made within the circuit and the board is assembled in a portable container so that it may be used by groups of apprentices under conditions where the usual instructional material of the class room is unavailable.

In certain instances, blueprints have been used as templates and these or other opaque photographed materials have been adhesively secured to the panel to provide an instructional board limited to a single electrical experiment.

Whether the replaceable template or adhesively secured template is used, the prior art instructional apparatus has suffered from the defect that repeated instructional use of the apparatus has caused serious difficulty in the life of the teaching equipment and in the sturdiness of the connecting components which have been used. In particular, the devices of the prior art have employed a plurality of studs or lugs in permanently secured engagement within the panel itself and the printed circuitry on the face of the panel has required the student to select from the array of studs certain studs which are continually employed in the various circuits which are formed. The studs or posts become dislodged through wear of the panel, and become displaced or misaligned and after the devices have been used for a relatively short time, it is necessary to repair and/or replace the panels and the studs because of the failure of the mechanical connections incurred through repeated usage by inexperienced students.

These difficulties in the prior art have been substantially completely eliminated by the new and improved floating grommet construction in the educational panel made in accordance with the present invention. Floating grommets are provided in the holes in the panel and the internal diameter of these grommets is such as to provide mechanically secure engagement for the retaining pins which these grommets engage. The retaining pins may be the mounting pins of an electrical circuit component as indicated hereinafter, which component may be a connector or a particular circuit element. The loose fit between the inner diameter of the hole and the outer diameter of the cylindrical portion of the grommet is such as to compensate for any size differential of the retaining pin or any misalignment of the retaining pins with respect to each other. A formed head or circular washer may be appropriately secured on the underside of the panel to the peripheral base of the grommet so as to stabilize the lateral displacement of the grommets with respect to each other and to maintain the cylindrical body of the grommet in a substantially vertical direction or perpendicular to the face of the panel. If plastic grommets were used, displacement of material to prevent grommet escape would be accomplished by a heated die. The grommets may be slotted to accommodate outsize pins and the cylinder body may be of sufficient thinness to expand the grommet at the same time that a mechanically secured engagement is retained.

Thus, it is an object of the invention to provide a construction of connecting means for mounting electrical components on a test board in combination with a transparent or opaque template bearing instructions to the student, the construction permitting tight mechanical engagement of the component parts on the board and ready disengagement without mechanical wear and electrical shorting.

To this end, the invention provides a plug-in mounting block and panel construction for educational purposes in the electronic and electrical sciences, said panel having grommets in spaced floating relationship within holes in said panel and said block being provided with rounded retaining pins for engagement in said floating grommets in said panel, said block being provided with upwardly extending terminal pins and lug members or other conducting means extending inwardly from the pins, these lug members and terminal pins adapted to mechanically and electrically connect electrical circuit components assembled with the aid of a template interposed between the mounting block and the panel, the template provided with printed instructional matter for the training of the student apprentice.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

An illustrative embodiment of the invention is shown in the accompanying drawings, in which Fig. 1 is a perspective view of the improved mounting block, with a flexible connector attached to one of its terminal posts.

Figure 2:
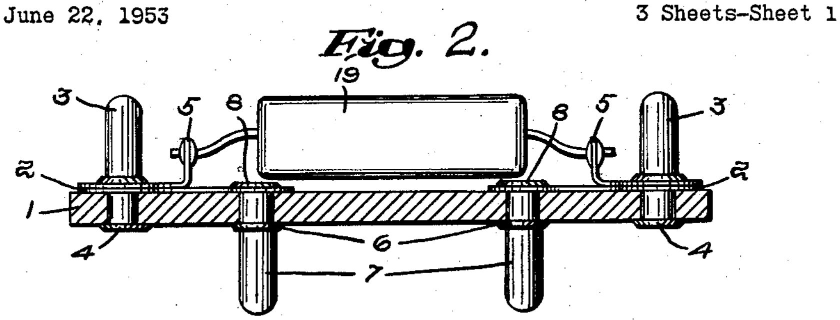
Fig. 2 is an elevation partly in longitudinal section of the mounting block of Fig. 1 with an electrical component mounted thereon.
Figure 1:
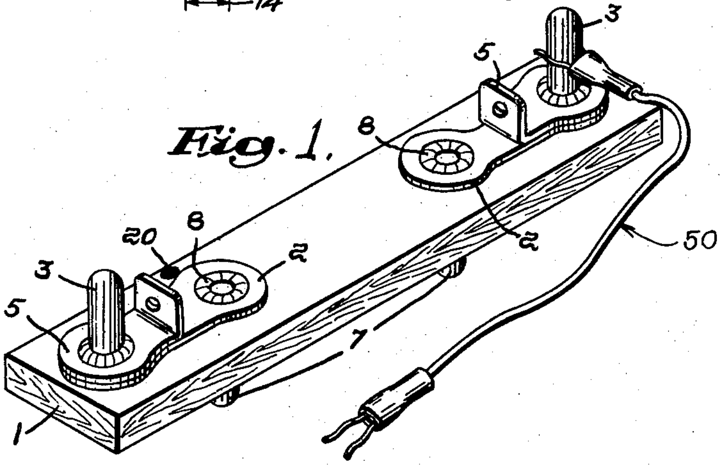

The mounting block is shown in Figs. 1 and 2. The mounting block 1 which may be made from clear cellulose butyrate plastic or like material has four holes drilled therein to accommodate upwardly extending terminal pins 3 and downwardly extending retaining pins 7. The solder lug 5 and connecting link 2 are assembled in relation shown with terminal pins 3 inserted through lug 5, link 2 and block 1 and these are securely held in mechanically and electrically assembled relationship by the pressure of formed head 4. In like manner, retaining pins 7 are assembled through block 1, shoulder 6 affording a stop for a riveting procedure, and the staking end of retaining pin 7 passes through block 1 and also link (2) and is held in secure mechanical and electrical relation by formed head 8. The materials used in known printed circuit procedures may be used to replace the metal link 2 for electrical instructional purposes in the study of printed circuit components alone or in circuit relationship.

Figure 6:
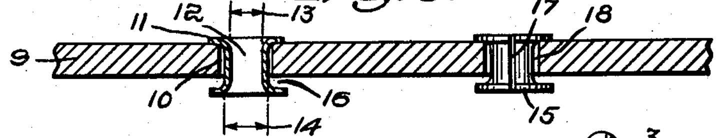
Fig. 6 is a section through two of the perforations of the panel, showing split eyelets in the perforations.

In Figure 6 there is shown a section of working panel 9 wherein holes 10 are properly made and spaced to insure insertion of the retaining pins 7 through the metal floating expansion grommets 11 and 15 to securely hold mounting block 1 in workable relationship with the working panel 9. The metal expansion grommets 11 and 15 have inner cylinders 12 which are normally made to provide inner diameters of 0.005″ less than the outside diameter of the retaining pin 7, whereby the retaining pins 7 may be pressed into the expansion grommets 11 and 15 and become securely held by friction, yet easily removed.

Holes 10 and 18 through panel 9 are each of such size that its diameter is 0.015″ greater than the outside diameter of the barrel of the expansion grommet. This creates a condition which allows sufficient clearance for the expansion of grommets 11 and 15 when the retaining pin 7 is pressed in, and also allows the grommets to float radially within the confines of hole 10. This floating action of the grommets is desired to compensate for even the slightest misalignment of pins 7; it also compensates for discrepancies in the pin size, whether oversize or undersize. The floating action of the grommets further provides the advantage of ease of mounting the block into the panel 9 regardless of the variation of the spacing distance between retaining pins 7. As will be clear from experience had in the engagement of pronged electrical devices into socket members, the spacing of the prongs in these devices is subject to frequent mechanical stress and misalignment during normal handling and the forcing of the prongs into the receiving socket frequently causes the bending and breaking of the prong mounting as well as enlargement of the receiving socket, which tend to cause mechanical and electrical breakdowns.

The requirement of a sturdy pin construction in spaced relationship within close tolerances to maintain the positive gripping action of the pins in the gripping socket has presented a troublesome problem to the art and many constructions have heretofore been proposed in an attempt to provide a solution of this problem. Particularly, in the assembly and disassembly of electrical devices which are used in circuitry, the art has been forced to sacrifice sturdiness of construction in the interest of maintaining accurate tolerances to insure positive trouble-free electrical connections. In the field of electrical educational devices, the user of the devices is less skilled than the expert and in his case, the need for providing connections which are sturdy and constructed with an accurate tolerance is particularly important. This need is satisfied in a new and unexpected beneficial manner by virtue of the combination of the expansible grommet together wtih the floating mount, whereby the gripping action of the expanded grommet is sufficient to securely grasp the retaining pin 7 in substantially immobile engagement and to provide a positive connection of the electrical element in the circuit. At the same time, the floating mount compensates the misalignment of the pins 7 as indicated above and sufficient play is had to permit ready disconnection of the circuit element.

In practice, it has been found that the clearance 16 between the formed head and the under or back side of the panel 9 may be of the order of 0.015″. As shown in Fig. 6, this clearance assures the proper floating characteristics of the expansion grommets 11 and 15.

As indicated above, the expansion and floating characteristics of the grommet are such as to permit accurate and positive engagement of the pins in the grommet to obtain secure connections of the electrical elements in the circuit. Upon repeated assembly and disassembly of the circuit elements in the panel through the floating expansible grommets, the enlargement of the hole size in the panel is completely avoided due entirely to the grommet construction in the assembly of the present invention. This is an important advantage since the pin material is almost invariably harder than the panel material and the repeated insertion of the pin through the panel into the mounting block eventually leads to such an extensive mechanical distortion of the holes in the panel as to require repair or replacement of the panel. Associated therewith, is also observed circuit failures due to imperfect and improper connections. This is of particular importance in mass instruction, since the student must put all of his time into the study of the circuit elements and their inter-relationship and this time would be lost if it were required to repair the poor connections resulting from mechanical abuse.

The gripping action of the floating grommet facilitates to a high degree the placement and withdrawal of the mounting block in those instances where slightly oversize or undersize pins are had from the normal production of the circuit elements. The floating and expansive action of the grommets adjusts for these variations in size and for the misalignment of these pins and this result is obtained without subjecting the pins to undue bending stress.

A further advantage is had from the direct gripping action of the floating grommets 11 and 15 since the working panel may readily be set up in the vertical plane and thereby provide for an easy demonstration by the instructor to large groups of students. The positive gripping action of the grommets obviates the possibility of the component falling from the working panel, whether the panel is vertical or upside down, and this remarkably facilitates the adaptability of the instructional devices embodying the inventive grommet arrangement for the teaching of beginners in electricity and electronics.

Fig. 2 illustrates the mechanical connection of terminal posts 3, 3 to the respective retaining pins 7, 7. When connected to the electrical energizing source, a path for the electron flow is had from one of the terminal posts 3 to one of the retaining pins 7. In one arrangement, the retaining pins may be maintained in non-conducting relationship in the circuit being constructed and connections may be made between formed heads 8 or lugs 5 on the upper side of the mounting block. Or the retaining pins 7 may be placed in conducting relation by means of a suitable electrical connector designed primarily to grip the rounded terminal posts, such, as for example, the solder-less frictional "push" type electrical connector 59 of applicant's U.S. Patent 2,578,360, shown in Fig. 1. Thus, the connection provided on the underside of the panel after the mounting block 1 has been pressed into the working panel 9 and the retaining pins connected together by suitable means, affords a complete electrical path from one of the terminal posts 3 to the other of the terminal posts 3, thus shorting out or bypassing the component 19. Shorting out the component 19 (a condenser as shown in Fig. 2) provides a purposeful abnormal condition admirably suited for the teaching situation where the component is substantially removed from the circuit so as to require the student to inspect and evaluate the circuit, using meters or other instruments. The student locates abnormality by resorting to measuring instruments applied solely from the top of the panel. The use of the connector between retaining pins 7 simulates the insertion of a defective component into the circuit and instructional time is gained by the simple expedient of removing the "short" so as to return the circuit to the normal condition.

It will be understood that the mounting of the component 19 to the lug 5 as shown in Fig. 2 is not necessarily restricted to soldering as is shown in this figure. For example, a spring engagement may be used or the lugs 5 may be modified to provide an inward right angle bend to permit a planer mounting of the component on the pins. Or, with the lugs so bent, the component may be soldered while lying flat on the top of the lugs. Further, the solder lug 5 may be omitted entirely and connection may be made directly to the links 2. In other instances, the connection of the component may be made with a special connector such as 50 on the underside of the panel to retaining pins 7. When a rectifier is used such as selenium rectifiers, the two normal mounting lugs may be mounted directly to another lug which is held in mechanical engagement with the terminal post.

Figure 5:
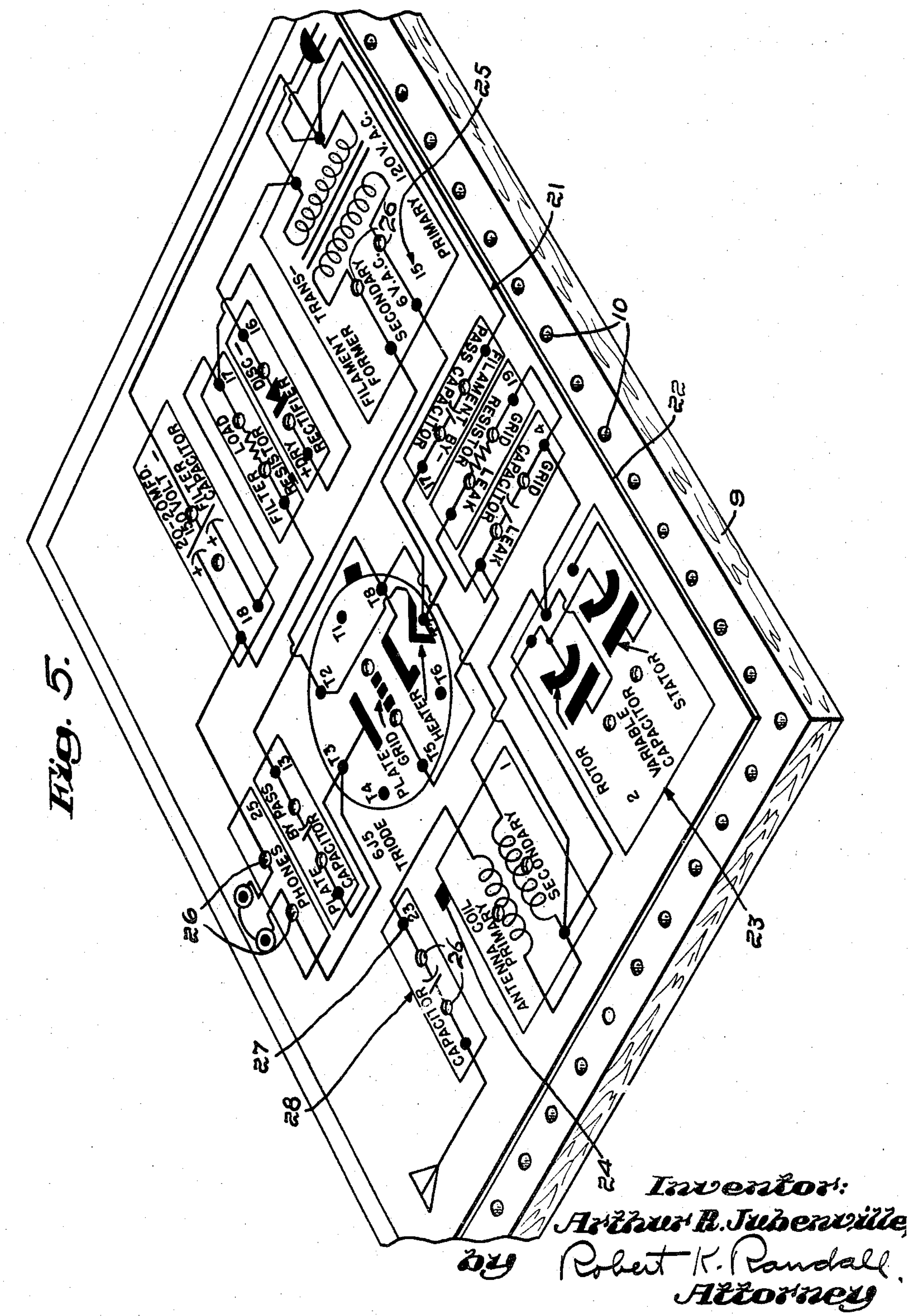
Fig. 5 is a perspective view of the perforated panel on which the components are mounted by means of their mounting blocks, with a template on the panel in registering relation with the perforations therein.

In Fig. 5 an embodiment of the invention is shown in which the working panel 9 and floating grommet are incorporated with an instructional template. In this figure, the template 22 may be made of a sheet of transparent non-conducting material such as a transparent cellulose ester resin, polystyrene, polymethyl methacrylate, polyvinyl chloroacetate, nylon (polyamide), polyethylene, equivalent acrylic resins or vinyl resins or co-polymers etc., parchmentized paper or fabric which has been made transparent may also be used. Transparent rubber hydrochloride films may be used. Transparent regenerated cellulose (cellophane) films may be used or transparent polyvinyl alcohol films may be used. These films may be surface treated to adapt them for printing, for example, a cellulose ester may be hydrolyzed at its surface to form an ink receptive stratum for ready marking and erasure with lead pencil and for bearing a permanent printed record.

Numbers and names are shown in printed relationship within the enclosed areas such as 23, 28, in template 22 of Fig. 5 which serve as instructional data to guide the student in the assembly of the particular circuit of the template and these are remarkably well adapted for self-instruction at home. The numbers are code numbers and may serve for ready identification in a course of instruction of graduated and increasing difficulty to permit the novice to learn the fundamentals of electrical and electronic science. The templates, in addition to the self-instructing features which have been provided thereon, may be used in connection with self-instruction lessons in booklet form and in each assembled template arrangement, study questions may be provided to permit complete and clear understanding of the significance of the circuit elements alone and in combination. The template 22 used over working panel 9 is of practical size and may be enclosed within a frame (not shown) which is encased in a portable carrying bag or portmanteau and in which portmanteau partitions may be provided to store lessons, templates, connectors, related equipment, and circuit components. The panel may be provided in the hinged lid of the carrying case or may be provided in the main body of the case.

In the panel, equally spaced holes 10 are arranged in horizontal and vertical lines over the length and width of the panel and the holes may each accommodate a floating grommet as described and shown in Fig. 6, whereby components may be mounted in these holes and in this manner a panel itself may carry all of the necessary components, connectors, and grommets for the purpose of a particular set of lessons forming a course of instruction. This facilitates removing the panel from the carrying case in the instruction of large classes under circumstances where it is undesirable to have loose equipment about.

The holes 10 may be as extensive as desired, it being understood that the arrangement of the templates and lessons and the inventory of the components therefor should be related to the number of holes provided in order to facilitate checking the equipment with the student before and after the period of instruction.

Opaque templates may be used in those situations where it is intended to conduct the instruction above the surface of the panel and for the conduct of examination where purposeful abnormal circuit conditions are created by the instructor to test the students' comprehension.

As indicated above, circuit symbols are printed within the enclosed areas to facilitate the learning of the drafting procedure and international symbols which are universally employed in the science of electricity and electronics. The printed symbols conform to the mounting outline of the components used and further conform to the mounting block outline (for example note the code number 23 in the enclosed "capacitor" area 28, Fig. 5. A mounting block outline 28 is reproduced by the enclosure. It conforms to the actual mounting block dimensions of block 1 in the assembly in Figs. 1 and 2.

Within each enclosed area such as indicated by the arrows 23 and 28 outlining a mounting block, two holes 26 are perforated through the template, and these holes are spaced to conform with holes 10 in working panel 9 and to the retaining pins 7 of the mounting block. Any number of holes greater than two may be used if desired, but the construction shown in Fig. 5 is preferred by virtue of its simplicity and improved mechanical operation. Thus, the template 22 is simply placed on working panel 9, with holes 26 aligned with the holes in the panel. All of the holes in the template are in such spaced relationship as to align with corresponding holes in the working panel for which the template has been designed. Code numbers on the components conform to the code numbers within the enclosed areas on the template, as for example the code numbers 2, 23, within the rectangles 23, 28, Fig. 5.

The component may be selected according to base outline as errors are manifested when a visual comparison is made for instance between base outline of filter capacitor, filament transformer and tuning capacitor. The component may be further selected by recognition of the actual part from the symbol shown. Those somewhat skilled in the art, for instance, could recognize the symbol in rectangle 28 and select the required component from a group of components by visual recognition.

Once the component has been selected, it must, in some cases, as for instance, the tube socket in the center, be positioned in a proper manner and other components likewise because of polarity or other considerations involving a primary or secondary winding as in the antenna coil, code #1. The rectifier shown in code #16 is a further example of a part where orientation in relation to the remaining components of the circuit is a prime consideration. To assure proper positioning of critical components, a key #24 Fig. 5 is made in the form of a rectangular black area and printed immediately adjacent to part outline in question. A colored dot or other significant marking like the mark 20, Fig. 1, is placed on the component base, said marking to be aligned with said key when inserting the pins of the assembled component and mounting block through template 22 and into expansion grommets of working panel 9.

A still further method of indicating and assuring correct positioning of parts is indicated at 25, Fig. 5. (Code #15). In this case, the part involved is a filament transformer. If the transformer were connected in reverse, due to a reversed position of the unit, with line voltage to normal secondary, excessive current would flow which may result in destruction of component as well as creating an excessive load on the source voltage. To avoid these undesirable effects, note that template 22 has holes 26, Fig. 5, which are off center in the enclosed area of the template. So, too, the holes for retaining pins in the mounting block for transformer (not shown) are off center. Should the operator, in error, attempt to reverse the position of the transformer, the mistake would be immediately evident as the original primary side of the mounting block would extend over the enclosed area of the adjacent filament by-pass capacitor, and if the capacitor were previously positioned, insertion of the transformer would be impossible. In the event, in a given circuit, no other component were located to make incorrect positioning impossible, the part of the enclosed area of the component in question exposed because of off set position of retaining pins and holes 26 in template 22 would be a further strong visual indication of error.

In use, said template 22, when positioned as indicated above, is held in place by the presence of any or all mounting blocks when assembled into the working panel as described, thus eliminating the need for tape, glue or other means of securing template. In use, said template 22, being placed on working panel 9 and all essential components being selected as described above and positioned as required for a given circuit or template, lines are left exposed outside of shaded areas covered by mounting block material. These exposed lines, outside of enclosed areas, which terminate at solid black dots 27, (Code 23) Fig. 5, within the enclosed area of a part outline, for instance 28, are guides for connecting the circuit into a complete dynamic functioning unit. It is suggested that this system is not limited to use of the special connectors 50 and terminal post shown in Fig. 1 and mentioned above, but may be readily adapted for use of current types of connectors available on the open market. Solid black dots 27 located within the enclosed area on template indicate the terminal posts 3 which are located in the mounting block and which are shown on the symbol as well as in the part itself and are connected to elements of the part in question. All connections to the terminal pins 3 of the various components are made above the panel, with the mounting blocks in place and undisturbed, except where short-circuiting is purposely effected beneath the panel, as described, for "trouble-shooting."

Figure 3:
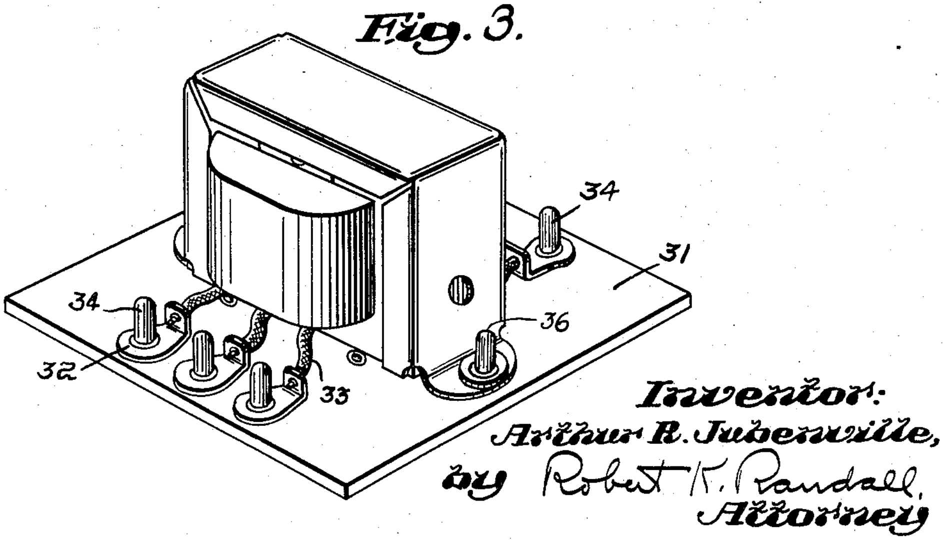
Fig. 3 is a perspective view of another mounting block with a different electrical component mounted thereon, showing the manner of arranging the terminal pins.
Figure 4:
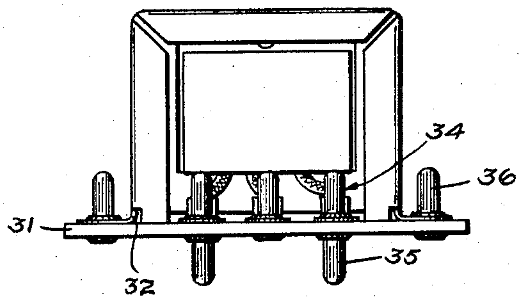
Fig. 4 is a side elevation of the device of Fig. 3.

Figs. 3 and 4 demonstrate the method of mounting one of a type of components which are suitable, namely a filament transformer, but which is not held mechanically to the mounting block by the conduction wire (as in Fig. 2) of the component. It is noted that 31 is base material previously described. 32 is a solder lug, through which leads 33 of the component make electrical connection with terminal post 34, which are pressure riveted through base 31. Retaining pins 35, previously described, provide the means for mounting the part in the working panel. It will be noted that the component is securely held to the mounting block by the pressure riveting of the terminal post which serves still another purpose, i.e. it is used to connect the case or shell of the component to ground. Posts 36 afford this connection to ground to eliminate undesirable conditions which would be had in the circuit without said connection.

This method can be applied, with all of its advantages, to any or all electric or electronic components of this nature.

Figures 7, 8:
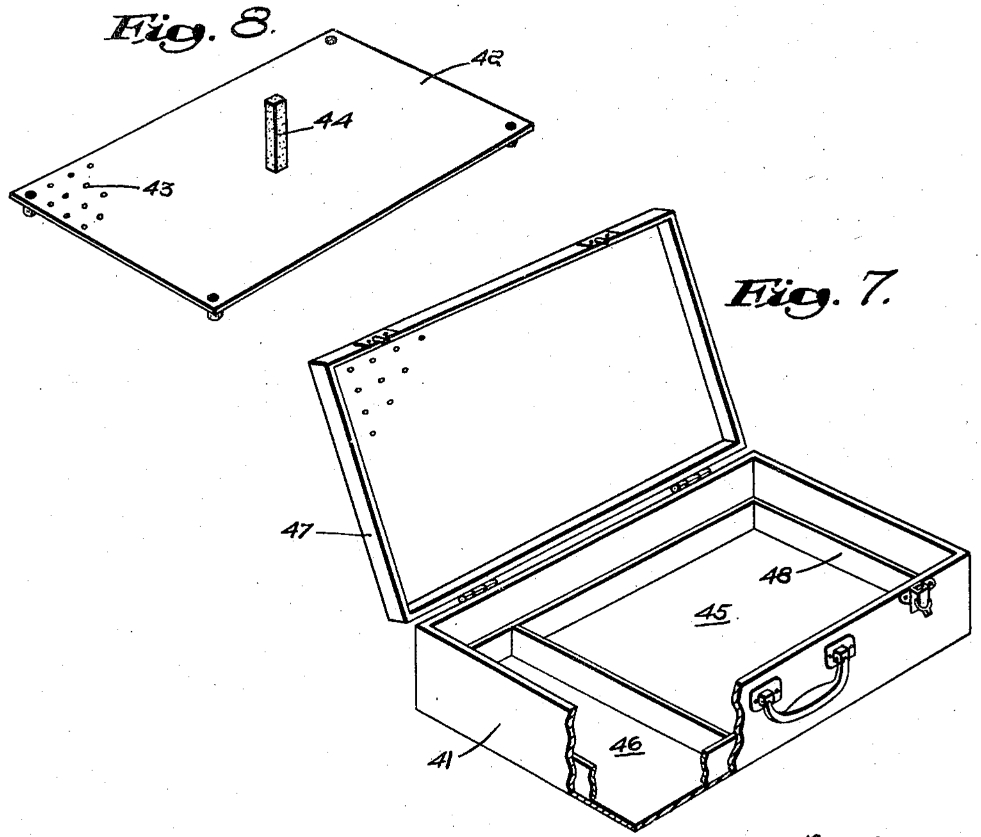
Fig. 7 is a perspective view of the carrying case.
Fig. 8 is a perspective view of the storage panel.

Fig. 7 and 8 illustrate the portable storage and working box. The box or case 41 which is provided contributes greatly to the efficiency and advantages of the system as described. The storage panel 42 stores all of the components related to the kit. Holes 43 are drilled on 1" centers over the entire surface of the storage panel. The components may be positioned by simply pressing their retaining pins into the holes provided. A number imprinted on the surface of the storage panel, between the holes, matches the code number on the underside of the mounting block to indicate where the component should be placed for storage and for easy selection. The number thus printed on the storage panel, if exposed, when the components have been returned for storage, instantly reveals to the operator the fact that a part is missing. In use, the case lid 47 is opened, the storage panel 42 is removed by grasping handle 44 (in the form of a post), and the panel is lifted out and placed adjacent to the case for easy access to the parts as required for a given circuit construction. The desired instruction sheets and templates may be removed from compartment 45, the connectors 50 removed from compartment 46, and case lid 47 closed. The circuit may then be assembled. The construction of the working panel which comprises the case lid is described above with relation to Figs. 1, 2 and 6.

When case lid 47 is closed, the working panel formed by the case lid is in a horizontal position, which is ideal for individual or small group demonstration. The case lid can be held open with a rod in an inclined position at a suitable angle to present a demonstration surface practical for larger groups who may be seated or standing at a distance from the demonstration.

The design of the case has taken into account the need for portability of the device. With all of the components positioned in the storage panel 42, as described above, with the templates and instruction sheets in compartment 45 and connectors in compartment 46, the storage panel is lifted by handle 44 and placed within the case resting on the ledge 48. The case lid is closed and locked in closed position by two case clasps. With the case closed and locked, handle 44 is of such length as to make contact with the underside of the case lid. The pressure of the case lid on the upper ends of the posts 44, maintains the storage panel securely and seals off the compartments 45 and 46 to keep the contents securely therein. The friction fit between the retaining pins of the mounting blocks and the holes in the storage panel securely holds the components to make the unit complete and effectively portable, regardless of the position of the case.

A still further application of the template is herein described. The template is inverted in its relation with working panel. That is, it is turned over, with its printed side downward and its original underside now upward. Imprinted on this side, between each two of the holes that pass the retaining pins into the working panel, are code numbers which indicate the part to be used. The operator places the template in register with the holes in the working panel as described, selects the component according to number and inserts the mounting block in the holes in the template which are one on each side of code number. In this manner the components for the circuit can be set up in a practical physical relation. This relation is, however, directly reversed from the previous arrangement with shaded area and connecting lines exposed. As such, this situation makes it necessary for the student to interpret and construct the circuit directly from the schematic diagram which is furnished. It affords practice in interpretation as well as affording a means of testing students' ability as all information such as names of parts, positioning according to polarity, connecting guide lines, etc., is hidden. The fact that the physical relationship of parts is completely reversed also presents a new and practical learning experience.

Another feature of this system which contributes to speedy effective learning or testing, without use of template, is the fact that the instructor may set up a given circuit in a wide variety of physical relationships in a matter of a few moments. The instructor may also place malfunctioning components or components of improper specifications to create conditions in the circuit which are abnormal and which offer a challenge to the learner, in the way of locating trouble. As described above, the instructor may quickly connect a jumper across the retaining pins of a given component, said jumper being connected after the component has been inserted through template and working panel so that connection is made underneath the working panel and out of sight of the operator or learner. This also constitutes an effective learning and testing situation and provides excellent practice in trouble shooting as the component is "shorted out" as described above.

In situations where the component may have more than two terminals of its elements, such as the filament transformer, a number of retaining pins equal to the number of element terminals may be used to make possible the combination of "shorting out" elements. Still further troubles may be introduced underneath the panel by connecting normally disassociated elements together to produce conditions which require and develop trouble shooting abilities. For instance, as an example, one side of the primary of the filament transformer may be connected to the grid of the tube, resulting in excessive hum which would be an abnormal condition. The addition of other components connected underneath the panel is contemplated, said component being held in electrical and mechanical connection by the connectors themselves.

For instance, as an example, a 1000 ohm resistor may be connected in parallel with the normal 2.2 megohm grid resistor or as a further example a .1 mfd. capacitor may be connected from plate side of phones to a ground terminal which may be the retaining pin which is connected by a link to the stator of the variable capacitor which is a normal "ground."

In the above description, the grommet has been indicated as being made from metal, but it should be understood that the grommet may also be made of a tough plastic material such as nylon (polyamide) or Bakelite (phenol formaldehyde condensation product), or Geon (polyvinyl chloride), or the like. When these materials are used, the grommet may be formed by injection molding and a longitudinal slot formed in the cylinder to permit expansion of the grommet in the outsize hole of the panel, or other equivalent means may be used to facilitate the expansion of the grommet to provide for the secure engagement of the retaining pin therein, and to maintain the floating characteristics of the mount. In certain instances, the thickness of the cylinder of the grommet may be such as to provide the close fit required and at the same time to maintain the floating relationship and further the base washer of the grommet may be formed in one piece with the cylinder in either the plastic or metal embodiment. The use of these plastic materials permits the grommet to be transparent if desired, and the base of the mounting block may also be transparent which facilitates the learning process, since the student may observe the wiring symbols and the instructions on the template immediately below the mounting block.

Due to the fact that the retaining pins of the mounting block are not centered in the enclosed area of the template and that the retaining pins are located some predetermined distance from the center of the mounting block, errors are obviated in the positioning of any component part. This relationship of the grommets in the panel body and pins in the mounting block permits the secure engagement of the template between the block and the panel and eliminates any other securing means for the positioning of the template on the panel as has been found necessary in the prior art. Further, the panel has a flush or plane surface and no pins protrude therefrom, the arrangement of the pins in the block providing the necessary terminals for electrical connection and this facilitates the storage and stacking of the panel units and further eliminates mechanical damage to the panel, since the pins of the prior art construction have been eliminated. This arrangement facilitates the removal of the template so that it can be inverted for examination sessions in which the student will be required to construct the circuit without the benefit of the instruction and code information. In this connection, schematic diagrams may be printed on both sides of the template in an appropriate area to familiarize the student with the construction operation based entirely upon the schematic diagram. Thus, the system afforded by the arrangement of the invention provides an excellent testing device to classify beginners in their ability to understand and interpret the printed instructions on the template and provides a ready means for rating the students in accordance with their development.

The printing of the templates may be done in color to conform to the standard color code so that grid and signal circuit components would be colored green, plate components blue, filament components yellow, B-plus and screen grid red, and ground return black.

In the various types of circuits and components as mounted in Fig. 5, the mountings may be effected by counter-sunk flat headed bolts with nuts, or by screws or rivets if desired.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

Having thus described my invention, what I claim is:

1. The combination of a panel having a multiplicity of holes, an electrical circuit component, a rigid mounting member for the component, at least one projection in connection with such component engaging in a hole in said panel for anchoring said mounting member in quick-detachable relation to said panel, electric terminal pins on said mounting member in manually accessible position above said panel while the member is in place on the panel, and means on said mounting member for fixing said electric component to said mounting member with capacity for electrical engagement with said terminals.

2. The combination of claim 1 in which a template bearing an electric circuit diagram is interposed between said mounting member and panel, and means are provided in connection with said template cooperating with said mounting member for locating said mounting member in correct orientation on said panel.

3. In combination, a panel having a plurality of holes, a plurality of electrical circuit components having terminals, a rigid mounting member for each component having at least one projection adapted to enter a hole in the panel and hold the member and its component in operative position on the front of the panel, connectors at the front of the panel electrically connecting the components, and means on the mounting member extending in spaced relation from and above the front of the panel, providing for frictional attachment and manual detachment of the connectors to and from the terminals of a component at the front side of the panel and while its mounting member remains fixed on the panel.

4. Electrical apparatus having in combination electrical components, mounting blocks having members projecting downwardly therefrom, a panel having a plurality of holes adapted to receive and frictionally retain the projecting members, terminals on the blocks above the panel and manually accessible from above the blocks, means mounting the electrical components on the blocks in electrical connection with the terminals, and flexible connectors electrically connecting the terminals of a plurality of electrical components and having end-portions slidable onto the terminals while the electrical components remain in place on the panel and gripping the terminals to maintain electrical-conducting contact therewith.

5. Electrical apparatus having in combination a panel having a plurality of holes, a plurality of electrical circuit components, a rigid mounting member for each component having at least one projection frictionally engaging in the panel and holding the mounting member in operatively fixed position on one face of the panel, terminals fixed on the mounting member on the side thereof away from such face and fixing the respective circuit component on the mounting member, and connectors having end-portions in slidable and gripping engagement with the terminals at points above and in spaced relation to such face of the panel.

6. Electrical apparatus having in combination electrical circuit components, a panel, a mounting member for each component having means frictionally attaching the member to the front of the panel in various locations, terminals on the mounting member above and away from the front of the panel and connected to its component, and connectors having end-portions adapted to be pushed onto the terminals at the front of the panel manually to make electrical connection therewith and to be pulled off manually for shift to another terminal while in each case the mounting member and its component remain in place on the panel.

7. The combination according to claim 3, in which the projection holds the mounting member in operative position by friction alone.

8. The combination according to claim 3 in which the connectors have elements slidably engaging and frictionally gripping the terminals above the block, and means which fix the electrical component on the block in electrical connection with the terminals.

9. The combination according to claim 5 in which floating grommets are provided in the holes and receive the projections and hold the mounting member in operatively fixed position.

References Cited in the file of this patent

UNITED STATES PATENTS

| | | |
|---|---|---|
| 1,157,026 | Meschenmoser | Oct. 19, 1915 |
| 2,390,706 | Hearon | Dec. 11, 1945 |
| 2,477,653 | Roane | Aug. 2, 1949 |
| 2,568,535 | Ballard | Sept. 18, 1951 |
| 2,592,552 | De Florez | Apr. 15, 1952 |
| 2,638,573 | Glickman et al. | May 12, 1953 |

FOREIGN PATENTS

| | | |
|---|---|---|
| 123,170 | Great Britain | Mar. 12, 1918 |